United States Patent
Komatsu et al.

(10) Patent No.: US 7,298,130 B2
(45) Date of Patent: Nov. 20, 2007

(54) SIGNAL DETECTOR

(75) Inventors: Yoshihide Komatsu, Osaka (JP);
Takefumi Yoshikawa, Osaka (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 1336 days.

(21) Appl. No.: 10/144,928

(22) Filed: May 15, 2002

(65) Prior Publication Data

US 2002/0172196 A1 Nov. 21, 2002

(30) Foreign Application Priority Data

May 17, 2001 (JP) ............................. 2001-147380

(51) Int. Cl.
*G01R 23/14* (2006.01)

(52) U.S. Cl. ............................... 324/76.41; 324/76.48; 365/207

(58) Field of Classification Search ............ 324/76.41, 324/76.12, 76.11; 365/207
See application file for complete search history.

(56) References Cited

U.S. PATENT DOCUMENTS

| | | | | |
|---|---|---|---|---|
| 3,099,800 A * | 7/1963 | Vinson et al. | ............... | 329/336 |
| 3,715,518 A * | 2/1973 | Campbell et al. | ...... | 379/102.02 |
| 4,381,563 A * | 4/1983 | Groom et al. | ............. | 324/73.1 |
| 4,504,786 A * | 3/1985 | Slaughter | ................. | 324/76.39 |
| 4,547,727 A * | 10/1985 | Tsui et al. | ............... | 324/76.47 |
| 4,593,379 A * | 6/1986 | Fourcade et al. | .......... | 713/401 |
| 5,300,896 A * | 4/1994 | Suesserman | ................ | 330/260 |
| 5,325,355 A | 6/1994 | Oprescu et al. | | |
| 5,384,769 A | 1/1995 | Oprescu et al. | | |
| 5,461,305 A * | 10/1995 | Kim | ........................ | 324/76.11 |
| 5,517,134 A | 5/1996 | Yaklin | | |
| 5,563,835 A * | 10/1996 | Oldham | ...................... | 365/207 |
| 5,737,273 A * | 4/1998 | Fujiwara et al. | ............ | 365/205 |
| 6,781,905 B2 * | 8/2004 | Fujiwara | ..................... | 365/207 |
| 7,199,579 B2 * | 4/2007 | Scheller et al. | ........ | 324/207.26 |
| 2006/0140318 A1 * | 6/2006 | Farjad-rad | .................. | 375/355 |

FOREIGN PATENT DOCUMENTS

| | | |
|---|---|---|
| JP | 6-104460 | 4/1994 |
| JP | 08-331185 | 12/1996 |
| JP | 2002-344540 A | 11/2002 |

* cited by examiner

*Primary Examiner*—Anjan Deb
(74) *Attorney, Agent, or Firm*—McDermott Will & Emery LLP

(57) ABSTRACT

A circuit for detecting whether an intermittent clock waveform signal of 50 MHz is received or not includes an offset receiver, a charge pump, a capacitor and a hysteresis comparator. A circuit for detecting whether a random data waveform signal of 500 MHz is received or not includes an offset-less receiver, a transition counter, a delay circuit and an AND circuit. An OR circuit outputs as a signal detection signal a signal indicating the OR operation result of respective outputs of the hysteresis comparator and the AND circuit.

10 Claims, 5 Drawing Sheets

SIGNAL DETECTOR

BACKGROUND OF THE INVENTION

The present invention relates to a signal detector for detecting an input signal in, e.g., a serial bus transceiver.

U.S. Pat. No. 5,325,355 discloses a bus transceiver connected to a serial bus according to, e.g., the IEEE1394 standard. This bus transceiver has a high speed, binary data transfer mode and a low speed, ternary control transfer mode. A binary receiver operates in the binary data transfer mode and a ternary receiver operates in the ternary control transfer mode. Moreover, a preemptive signaling receiver is provided to receive a clock signal. A level shifting circuit for common mode shifting of signals is provided at the input of each receiver.

The bus transceiver according to the IEEE1394.b standard requires a signal detector for detecting an input signal having various frequencies.

SUMMARY OF THE INVENTION

It is an object of the present invention to provide a signal detector capable of covering a wide input frequency range.

In order to achieve the above object, a signal detector according to the present invention includes a first circuit for detecting whether a low speed signal having an amplitude greater than a preset value is received or not, a second circuit for detecting whether a high speed signal having a frequency higher than that of the low speed signal is received or not, and an OR circuit for supplying as a signal detection output a signal indicating an OR operation result of respective outputs of the first circuit and the second circuit.

For example, the first circuit may include an offset receiver, a charge pump, a capacitor and a comparator, and the second circuit may include an offset-less receiver and a transition counter.

DETAILED DESCRIPTION OF THE INVENTION

Hereinafter, embodiments of the present invention will be described with reference to the accompanying drawings.

Figure 1:
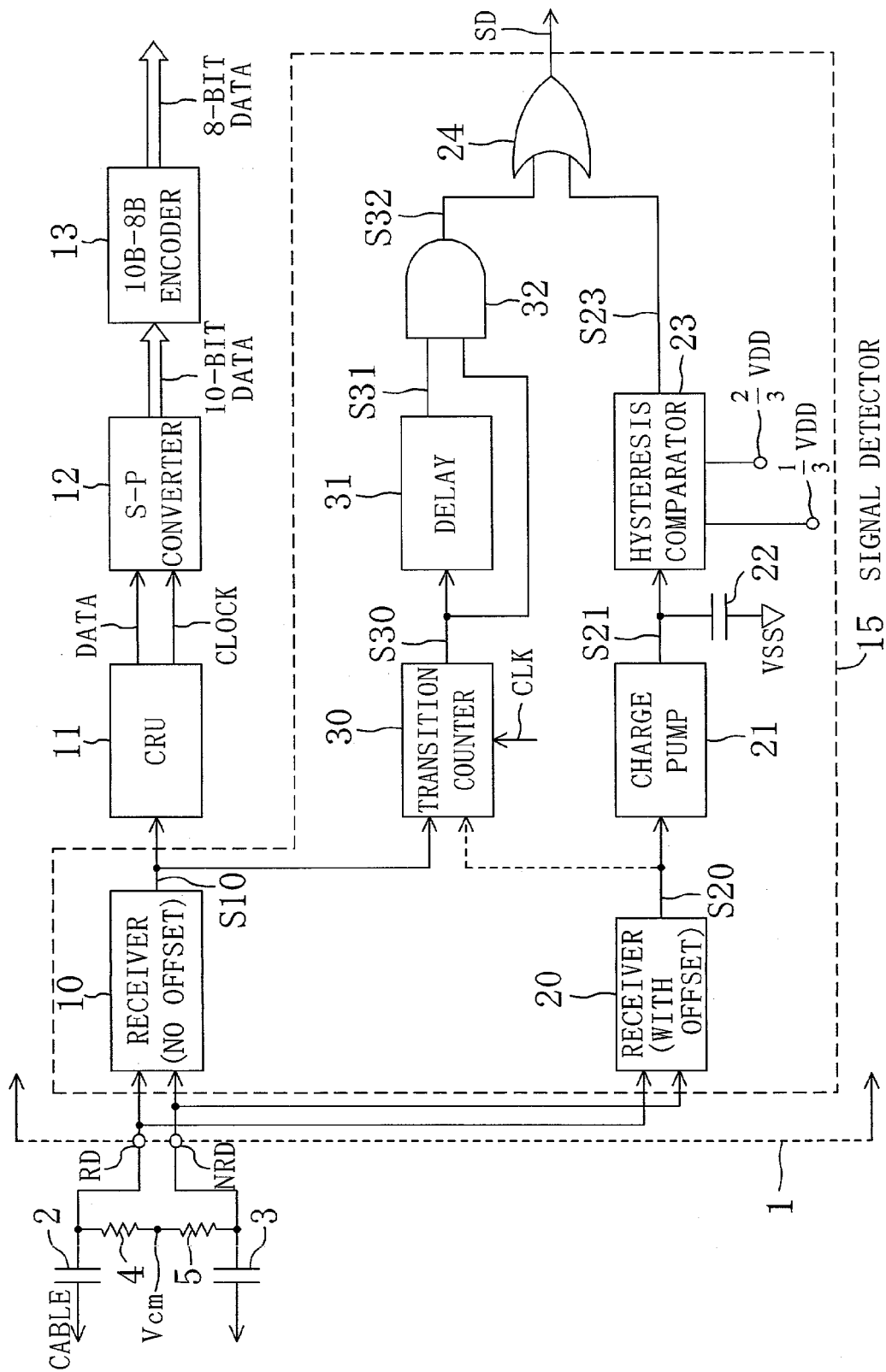
FIG. 1 is a block diagram showing part of a serial bus interface LSI including a signal detector according to the present invention.

FIG. 1 is an example in which the present invention is applied to a serial bus interface LSI 1 according to the IEEE1394.b standard. Differential input terminals RD, NRD of LSI 1 in FIG. 1 are connected to a twisted pair cable through capacitors 2, 3 for removing DC components, respectively. Two terminal resistors 4, 5 are connected in series with each other between the differential input terminals RD, NRD. An intermediate tap voltage of the terminal resistors 4, 5 is called a common mode voltage Vcm.

The LSI 1 first receives an input signal (low speed signal) having an intermittent clock waveform of 50 MHz for speed negotiation at the differential input terminals RD, NRD. After a data transfer rate is determined, an input signal (high speed signal) having a random data waveform of, e.g., 500 MHz is applied to the differential input terminals RD, NRD. The 500-MHz input signal is processed by a receiver 10, a clock recovery unit (CRU) 11, a serial-parallel (S-P) converter 12 and a 10-bit-8-bit (10B-8B) encoder 13. The receiver 10 amplifies the input signal without offset and supplies an output S10 indicating the amplification result to the CRU 11. Note that illustration of a transmitter in the LSI 1 is omitted in FIG. 1.

The LSI 1 in FIG. 1 further includes a signal detector 15 capable of covering such a wide input frequency range. The illustrated signal detector 15 includes an offset receiver 20, a charge pump 21, a capacitor 22 and a hysteresis comparator 23 in order to detect whether a low speed signal having a amplitude greater than a preset value is received or not. The offset receiver 20 amplifies a signal received through the differential input terminals RD, NRD and produces an output S20. The output S20 changes between H level and L level according to this input signal only when the input signal has an amplitude greater than a prescribed offset (e.g., 50 mV). When the amplitude of the input signal is not greater than 50 mV, the output S20 is retained at L level. The charge pump 21 converts the output S20 of the offset receiver 20 into a current. The capacitor 22, which is inserted between an output S21 of the charge pump 21 and a ground voltage VSS, converts the output current of the charge pump 21 into a voltage. Accordingly, a terminal voltage of the capacitor 22 fluctuates according to the level (H level, L level) of the output S20. A charging current of the capacitor 22 is preset to a value larger than a discharging current thereof so that the terminal voltage of the capacitor 22 gradually rises when the H level period of the output S20 has the same length as that of the L level period thereof. The hysteresis comparator 23 is a comparator having hysteresis in input/output characteristics in order to prevent malfunction. The hysteresis comparator 23 compares the terminal voltage of the capacitor 22 with a first reference voltage (⅓)×VDD and a second reference voltage (⅔)×VDD, and supplies the comparison result as an output S23. The first and second reference voltages are voltages that vary according to variation in power supply voltage VDD. The output S23 is set to H level when the terminal voltage of the capacitor 22 exceeds (⅔)×VDD. The output S23 is set to L level when the terminal voltage of the capacitor 22 is less than (⅓)×VDD. The output S23 of the hysteresis comparator 23 is connected to one input of an OR circuit 24.

The signal detector 15 in FIG. 1 further includes a transition counter 30, a delay circuit 31 and an AND circuit 32 in addition to the receiver 10 in order to detect whether a high speed signal is received or not. The transition counter 30 checks if the number of transitions of the output S10 of the receiver 10 exceeds a prescribed value within a fixed period. More specifically, according to a clock signal CLK having a frequency corresponding to the determined data transfer rate, the transition counter 30 asserts its output S30 to H level when the number of transitions of the output S10 reaches thirty-two or more within 512 cycles of the clock signal CLK. The delay circuit 31 delays the output S30 for output as a signal S31. The AND circuit 32 supplies the AND operation result of the outputs S30, S31 as an output S32. Accordingly, the output S32 is behind the output S32 only for the timing of the rise. The output S32 of the AND circuit 32 is connected to the other input of the OR circuit 24. The OR circuit 24 supplies a signal indicating the OR operation result of the outputs S23, S32 as a signal detection output SD.

Figure 2:
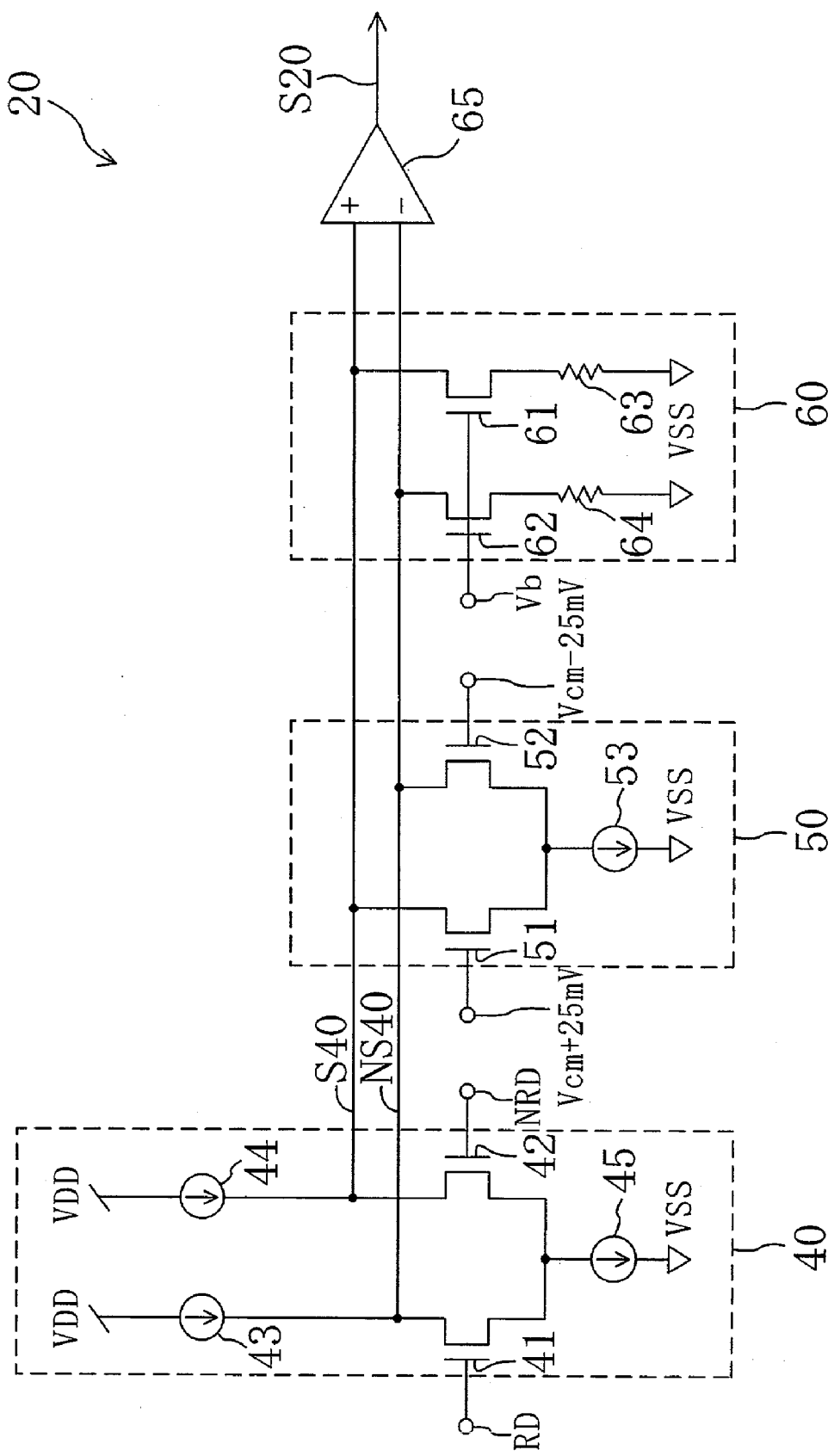
FIG. 2 is a circuit diagram showing an example of the specific structure of an offset receiver in FIG. 1.

Even when the circuit formed by the offset receiver 20, charge pump 21, capacitor 22 and hysteresis comparator 23 cannot follow a high speed signal, the offset-less receiver 10 and the transition counter 30 can follow this signal. Note that, when the offset receiver 20 has a structure capable of following a high speed signal, the output S20 of the offset receiver 20 may be supplied to the transition counter 30 instead of the output S10 of the offset-less receiver 10, as shown by dashed line in FIG. 1. In this case, even if the output S10 of the receiver 10 is uncertain, signal detection can be implemented without any influence thereof FIG. 2 shows an example of the specific structure of the offset receiver 20 in FIG. 1. The offset receiver 20 in FIG. 2 includes an input amplifier section 40, an offset section 50, an output load resistor section 60, an output amplifier section 65, and differential signal lines S40, NS40 connecting these components to each other. The input amplifier section 40 includes MOS (Metal Oxide Semiconductor) transistors 41, 42 and current sources 43, 44, 45 in order to amplify a signal received through the differential input terminals RD, NRD and output the amplified signal to the differential signal lines S40, NS40. The offset section 50 includes a MOS transistor 51 receiving a gate voltage Vcm+25 mV, a MOS transistor 52 receiving a gate voltage Vcm−25 mV, and a current source 53 in order to implement an offset of, e.g., 50 mV. The output load resistor section 60 includes MOS transistors 61, 62 receiving a common bias voltage Vb at their gates, and resistors 63, 64. When the input amplitude of the input amplifier section 40 is greater than 50 mV, the input amplifier section 40 predominantly operates as compared to the offset section 50.

Therefore, the output S20 changes between H level and L level according to the signal received through the differential input terminals RD, NRD. However, when the amplitude of the input signal is not greater than 50 mV, the offset section 50 predominantly operates as compared to the input amplifier section 40. Therefore, the offset section 50 forcibly sets the output S20 to L level.

Figure 3:
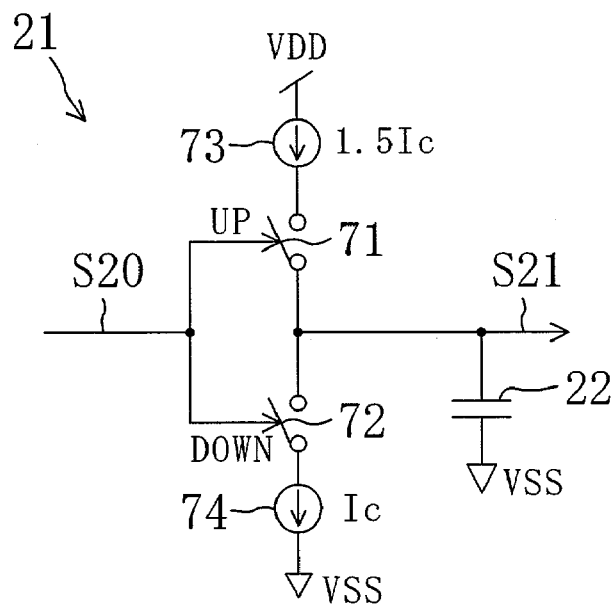
FIG. 3 is a circuit diagram showing an example of the specific structure of a charge pump in FIG. 1.

FIG. 3 shows an example of the specific structure of the charge pump 21 in FIG. 1.

The charge pump 21 in FIG. 3 includes an up-switch 71, a down-switch 72, a current source 73 for supplying a current (1.5×Ic) to the capacitor 22, and a current source 74 for drawing a current Ic out of the capacitor 22. When the output S20 of the offset receiver 20 is retained at L level, the down-switch 72 is retained in the ON state to continuously discharge the capacitor 22. Accordingly, the terminal voltage of the capacitor 22 will not exceed (⅔)×VDD. On the other hand, when the output S20 changes between H level and L level, the capacitor 22 is alternately charged and discharged. A charging current (1.5×Ic) is larger than a discharging current (Ic). Therefore, when the H level period of the output S20 corresponding to a clock waveform has the same length as that of the L level period thereof, the terminal voltage of the capacitor 22 gradually rises and finally exceeds (⅔)× VDD.

Figure 4:
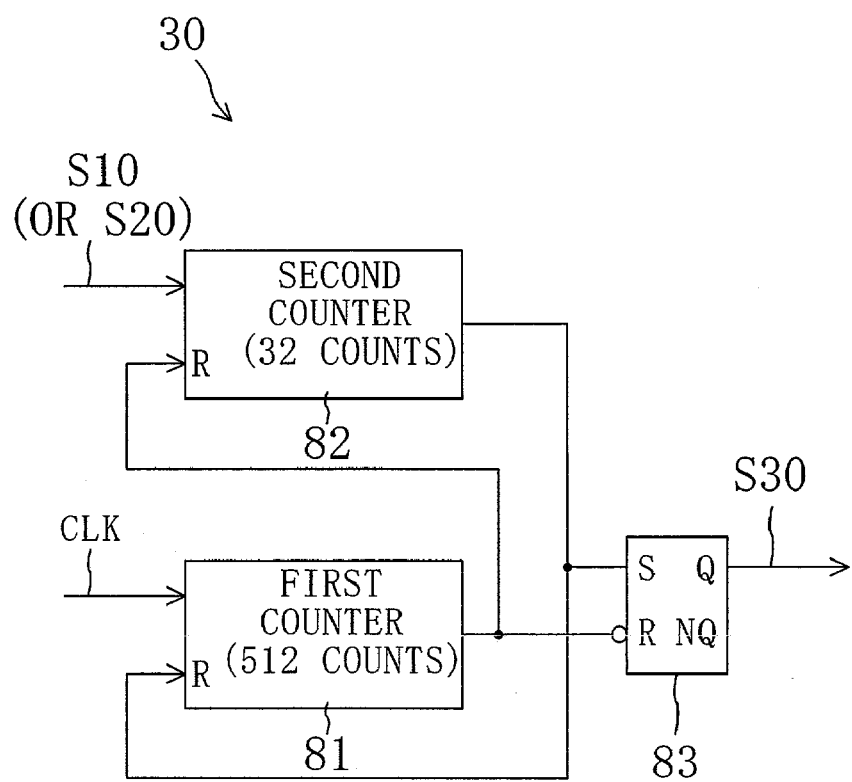
FIG. 4 is a circuit diagram showing an example of the specific structure of a transition counter in FIG. 1.

FIG. 4 shows an example of the specific structure of the transition counter 30 in FIG. 1. The transition counter 30 in FIG. 4 includes a first counter 81, a second counter 82 and an SR latch 83. The first counter 81 counts 512 cycles of the clock signal CLK, and the second counter 82 counts 32 cycles of the output S10 (or S20). If the second counter 82 finishes counting 32 cycles before the first counter 81 finishes counting 512 cycles, the SR latch 83 is set according to the output of the second counter 82. As a result, the output S30 is asserted to H level. However, if the first counter 81 finishes counting 512 cycles before the second counter 82 finishes counting 32 cycles, the SR latch 83 is reset according to the output of the first counter 81. As a result, the output S30 returns to L level.

Figure 5:
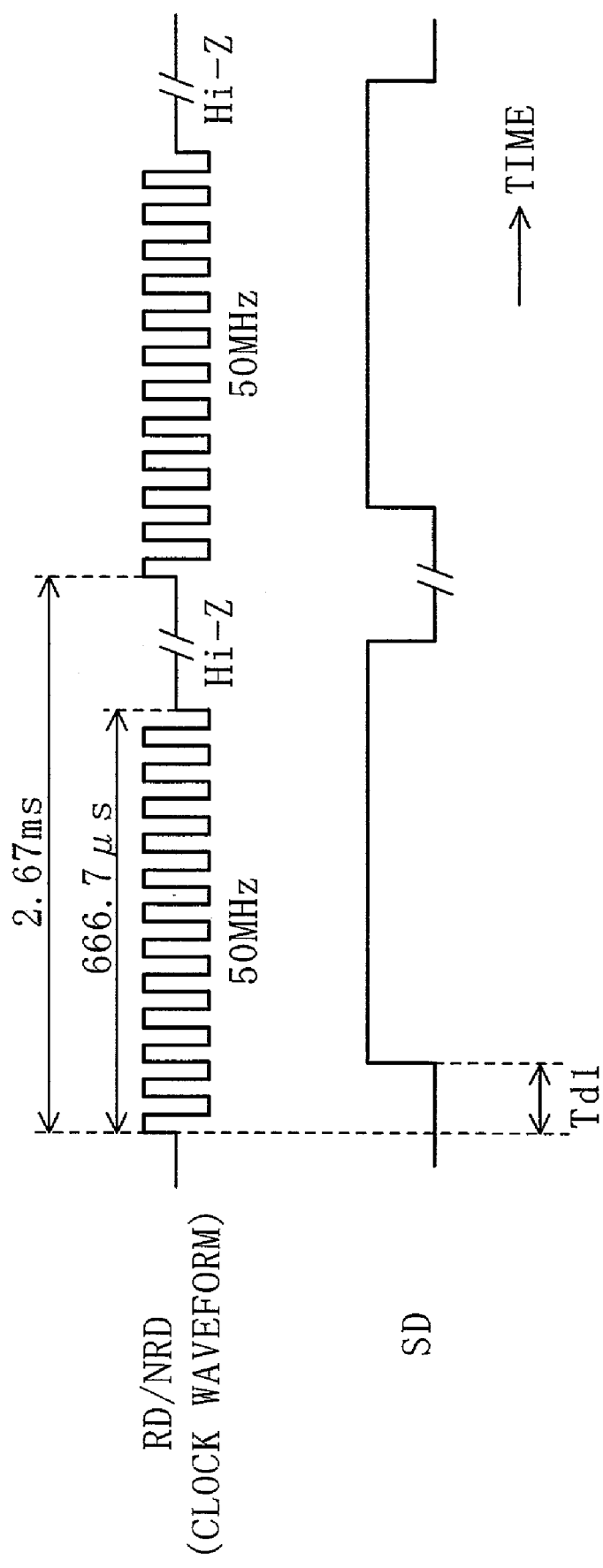
FIG. 5 is a timing chart illustrating an example of a signal detection output produced when the signal detector in FIG. 1 receives a 50-MHz clock waveform.

FIG. 5 shows an example of the signal detection output SD produced when the signal detector 15 in FIG. 1 receives a 50-MHz clock waveform. It is herein assumed that an intermittent clock waveform having a cycle of 2.67 ms and duration of 666.7 μs is applied to the differential input terminals RD, NRD, and the differential input terminals RD, NRD are rendered in the high impedance state (Hi-Z) during the remaining period of each cycle. In this case, the offset receiver 20, charge pump 21, capacitor 22 and hysteresis comparator 23 mainly operate out of the components in the signal detector 15, and the signal S23 is output as signal detection output SD. T$d$1 is a delay time of the signal detection output SD with respect to the input waveform of the differential input terminals RD, NRD. Note that it is preferable to determine a time constant by the charge pump 21 and the capacitor 22 and set the delay time of the delay circuit 31 so as to prevent the signal S32 from being output prior to the signal S23.

Figure 6:
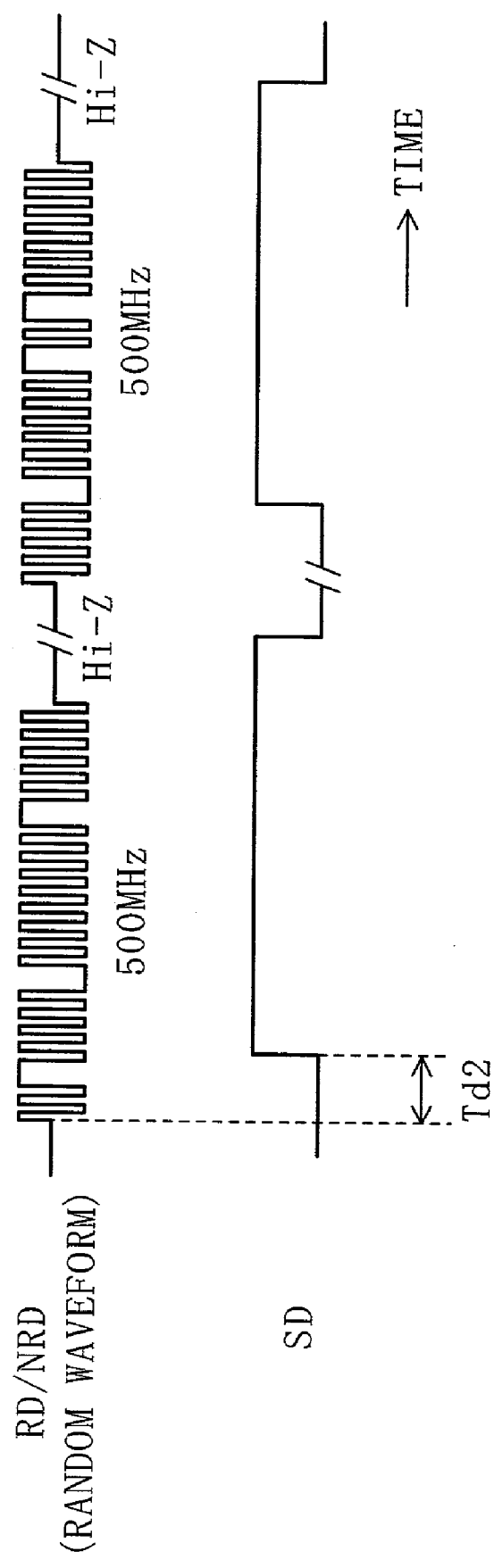
FIG. 6 is a timing chart illustrating an example of a signal detection output produced when the signal detector in FIG. 1 receives a 500-MHz random data waveform.

FIG. 6 shows an example of the signal detection output SD produced when the signal detector 15 in FIG. 1 receives a 500-MHz random data waveform. In this case, the receiver 10, transition counter 30, delay circuit 31 and AND circuit 32 mainly operate out of the components in the signal detector 15, and the signal S32 is output as signal detection output SD. T$d$2 is a delay time of the signal detection output SD with respect to the input waveform of the differential input terminals RD, NRD.

Note that the capacitors 2, 3 and the terminal resistors 4, 5 in FIG. 1 serve to slightly delay the signals of the differential input terminals RD, NRD and may be incorporated in the LSI 1.

What is claimed is:

1. A signal detector, comprising:
    a first circuit for detecting whether a low speed signal having an amplitude greater than a preset value is received or not;
    a second circuit for detecting whether a high speed signal having a frequency higher than that of the low speed signal is received or not; and
    an OR circuit for supplying as a signal detection output a signal indicating an OR operation result of respective outputs of the first circuit and the second circuit,
    wherein the first circuit includes an offset receiver for amplifying an input signal received through differential input terminals so as to produce an output that varies according to the input signal only when the input signal has an amplitude greater than a prescribed offset.

2. The signal detector according to claim 1, wherein the first circuit further includes
    a charge pump for converting the output of the offset receiver into a current,
    a capacitor for converting the current output from the charge pump into a voltage, and
    a comparator for comparing a terminal voltage of the capacitor with a reference voltage and supplying a signal indicating the comparison result to the OR circuit.

3. The signal detector according to claim 2, wherein the comparator is a hysteresis comparator having hysteresis in input/output characteristics.

4. The signal detector according to claim 1, wherein the second circuit includes
    a receiver for amplifying an input signal received through differential input terminals, and
    a transition counter for checking if the number of transitions of an output of the receiver exceeds a prescribed value within a fixed period.

5. The signal detector according to claim 4, wherein the receiver is an offset receiver for varying its output according to the input signal received through the differential input terminals only when the input signal has an amplitude greater than a prescribed offset.

6. The signal detector according to claim 4, wherein the second circuit further includes
    a delay circuit for delaying an output of the transition counter, and
    an AND circuit for supplying a signal indicating an AND operation result of respective outputs of the transition counter and the delay circuit to the OR circuit.

7. The signal detector according to claim 1, further comprising:
    differential input terminals for receiving an input signal;
    capacitors connected in series with the differential input terminals, respectively; and
    terminal resistors inserted between the differential input terminals.

8. A signal detector, comprising:
    a first circuit for detecting whether a low speed signal having an amplitude greater than a preset value is received or not;
    a second circuit for detecting whether a high speed signal having a frequency higher than that of the low speed signal is received or not; and
    an OR circuit for supplying as a signal detection output a signal indicating an OR operation result of respective outputs of the first circuit and the second circuit,
    wherein the second circuit includes a receiver for amplifying an input signal received through differential input terminals, and a transition counter for checking if the number of transitions of an output of the receiver exceeds a prescribed value within a fixed period.

9. The signal detector according to claim 8, wherein the receiver is an offset receiver for varying its output according to the input signal received through the differential input terminals only when the input signal has an amplitude greater than a prescribed offset.

10. The signal detector according to claim 8, wherein the second circuit further includes
    a delay circuit for delaying an output of the transition counter, and
    an AND circuit for supplying a signal indicating an AND operation result of respective outputs of the transition counter and the delay circuit to the OR circuit.

* * * * *